United States Patent [19]

Kagosaki

[11] Patent Number: 5,099,276
[45] Date of Patent: Mar. 24, 1992

[54] METHOD OF CONTROLLING EXPOSURE OF PROCESS CAMERA USING SUB-EXPOSURE AND APPARATUS THEREFOR

[75] Inventor: Hiroshi Kagosaki, Shiga, Japan

[73] Assignee: Dainippon Screen Mfg. Co., Ltd., Kyoto, Japan

[21] Appl. No.: 645,764

[22] Filed: Jan. 25, 1991

[30] Foreign Application Priority Data

Jan. 30, 1990 [JP] Japan .................................. 2-21389

[51] Int. Cl.$^5$ ............................................ G03B 27/54
[52] U.S. Cl. ........................................ 355/70; 355/77
[58] Field of Search .................................. 355/70, 77

[56] References Cited

U.S. PATENT DOCUMENTS 3,619,055 11/1971 Archer et al. ...................... 355/70
4,185,914 1/1980 Holthusen ........................... 355/70
4,690,548 9/1987 Holm .................................. 355/77

OTHER PUBLICATIONS

"Trends of Recent Exposure Control Apparatus", *Printing Magazine*, No. 8, vol. 58, 1978, pp. 43–47.
"Exposure Control and Apparatus Therefor", *35 Years of Image Techniques*, Oct. 11, 1978, pp. 93–99.

*Primary Examiner*—Monroe H. Hayes
*Attorney, Agent, or Firm*—Lowe, Price, LeBlanc & Becker

[57] ABSTRACT

Disclosed are a method of and an apparatus for controlling exposure in halftone photography by calculating a main exposure amount, a bump exposure amount and a flash exposure amount based on basic data peculiar to the combination of a screen and a photosensitive material original data depending on an original in a process camera. The method includes the steps of preparing the basic data and the original data, obtaining a dot image by exposing the original to a photosensitive material through a screen based on the prepared basic data and original data, defining a resultant dot percentage correction value by obtaining differences between dot percentages of the portions of the obtained dot image which portions corresponding to a highlight region and a shadow region of the original, respectively, and the respective desired values, and correcting at least one of the main exposure amount, the bump exposure amount and the flash exposure amount based on the resultant dot percentage correction value and the basic data. The difference between the dot percentage of the dot image obtained as a result of the exposure and a desired value can be used as a correction value, and therefore, a dot image having a desired dot percentage can be obtained without requiring a difficult procedure of evaluating a correction result.

16 Claims, 11 Drawing Sheets

(a) INCIDENT LIGHT
(b) ORIGINAL DENSITY
(c) TRANSMITTED LIGHT
(d) DENSITY DISTRIBUTION OF CONTACT SCREEN
(e) FORMED DOT (a) SCREEN DENSITY
(b) DENSITY CONTOUR MAP

FIG.6 PRIOR ART
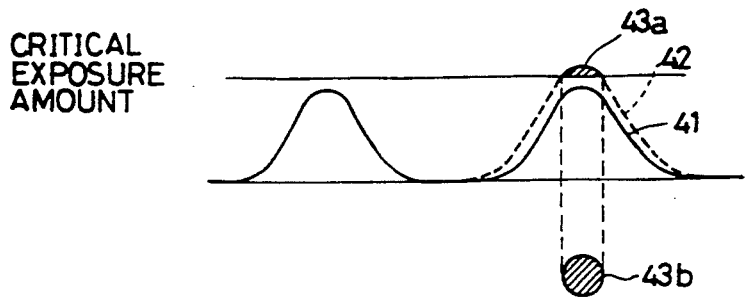
FIG.7 PRIOR ART
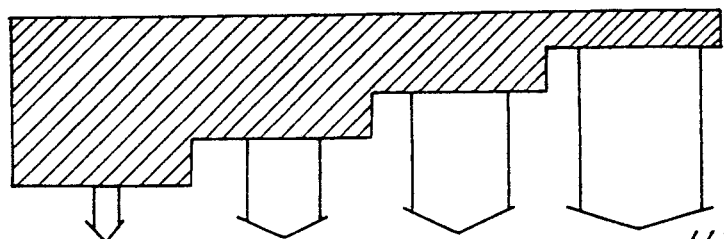
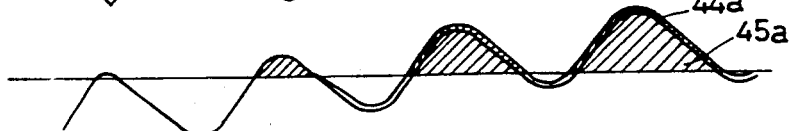
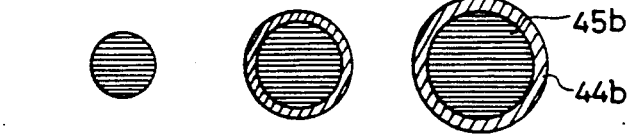
FIG.8 PRIOR ART
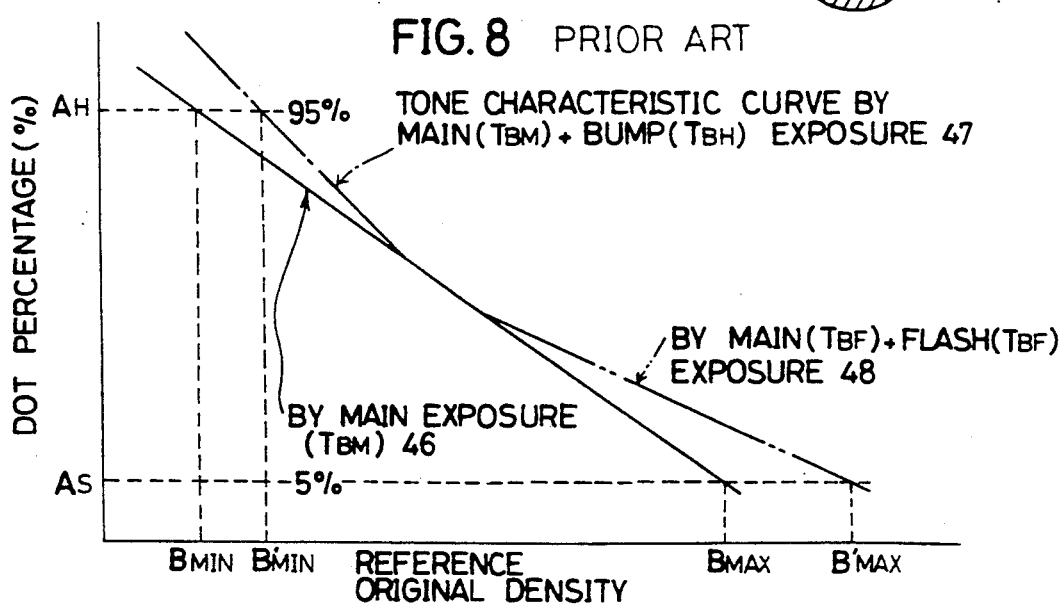

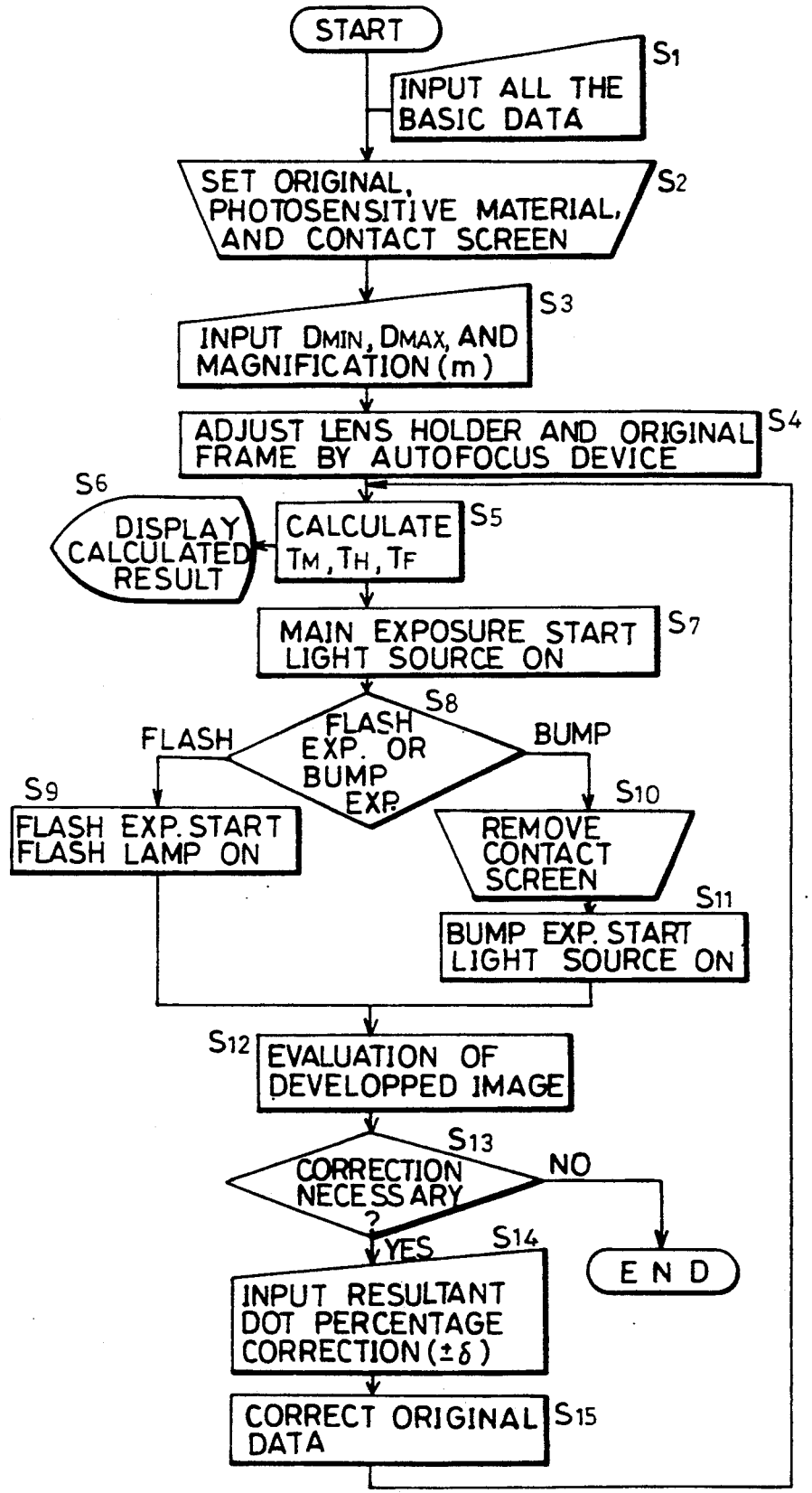

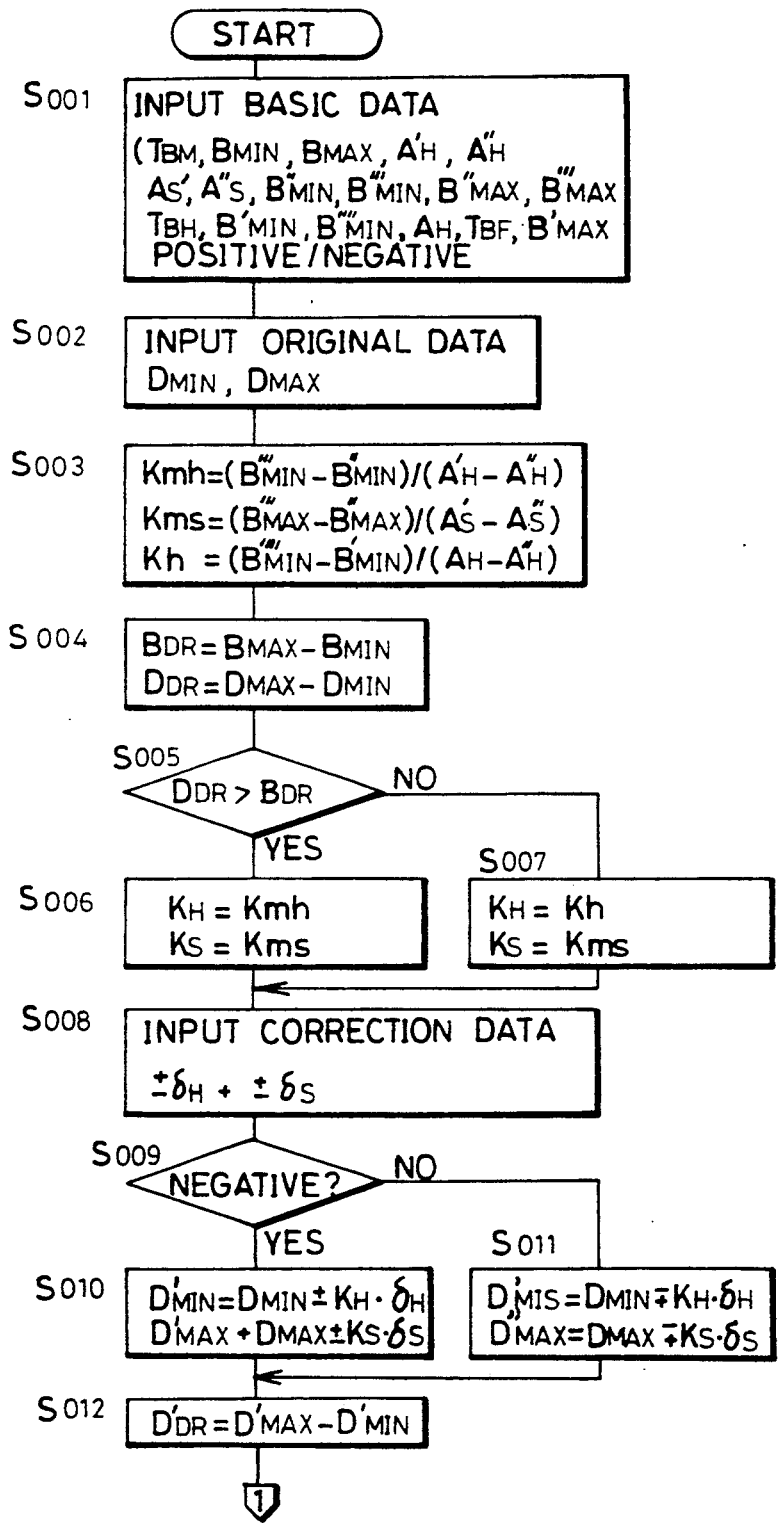

METHOD OF CONTROLLING EXPOSURE OF PROCESS CAMERA USING SUB-EXPOSURE AND APPARATUS THEREFOR

BACKGROUND OF THE INVENTION

1. Field of the Invention

The present invention relates generally to a method of controlling exposure of a process camera and an apparatus therefor, and more particularly, to a method of controlling halftone photography using sub-exposure in a process camera and an apparatus therefor.

2. Description of the Related Art

Obtaining halftone negative image of an original by using a screen, such as a contact screen and a halftone screen, is called halftone photography. In halftone photography, contrast of the obtained halftone negative image should be made appropriate in accordance with different originals having different densities. The exposure at the halftone photography should be accordingly controlled with high precision.

The halftone negative image is required for the following reasons. In letterpress printing, offset printing, screen printing and the like, continuous tones of an original having contrast such as a photograph are converted to tones represented by the dot areas of the halftone negative image because the continuous tones are difficult to obtain by a printing press or the like. The reason for it is that the printing press basically carries out printing by pressing the surface with ink applied thereto the paper with specific pressure, and therefore does not allow a subtle adjustment of the pressure as a person does.

Referring to FIG. 1, suppose an original having a step-like density distribution as shown in FIG. 1 (b) is exposed to a film through a contact screen by a transmitted light of specific intensity shown in FIG. 1 (a) Hereinafter, "density" of an original is defined as follows throughout this specification and claims attached thereto.

A density Dt of a transparent original (an original through which a light is transmitted) such as a film can be expressed by the following equation:

$$Dt = \log (I_o/I_0) \ldots \quad (1)$$

where an intensity of an incident light to the original is represented as $I_0$ and an intensity of the light after transmitting through the original is represented as $I_t$.

It can be seen from the equation (1) that the higher the density Dt is, the smaller the intensity of the transmitted light is. The intensity of the light transmitted through the original having the density distribution as shown in FIG. 1 (b) will be shown accordingly by FIG. 1 (c). In FIG. 1 (c), the light intensity is represented as a width of the arrow. The density Dt defined by equation (1) is referred to as a transmission density throughout the specification and the claims.

On the other hand, printed matters and photographs are not transparent. Therefore, for such an original (reflection original), its density Dr is defined as follows. A standard sample is illuminated with a predetermined light and the intensity Is of the reflected light is measured. The sample for comparison is illuminated with the same light and the intensity Ir of the reflected light is obtained. The density Dr will be expressed by the following equation.

$$Dr = \log (Is/IR) \ldots \quad (2)$$

The density Dr defined by equation (2) is referred to as a reflection density throughout the specification and the claims.

For a contact screen, its transmission density Dt is called "screen density". The distribution of screen density of a contact screen in general is shown in FIG. 1 (d).

The light of such amount as shown in FIG. 1 (c) is transmitted through the contact screen having the density distribution as shown in FIG. 1 (d) to reach the film. a film called a lith film is generally used for a photomechanical process. The lith film produces dots when exposed to a light (amount is referred to as an integral exposure amount) of more than a specific amount.

Therefore, when smaller amount of light is transmitted through the original, dots are formed at only the portions where the densities of the contact screen are low. As the light amount transmitted through the original, is increased which is the lith film produces larger dots. In this way, the halftone negative image is obtained having larger dots representing lower density (brighter) portions of the original and smaller dots representing higher density (darker) portions of the original.

A density distribution of a contact screen is peculiar to the contact screen. In addition, a density range of an original which can be reproduced through one exposure by using a contact screen having a predetermined density distribution is defined by a maximum value and a minimum value of the density of the contact screen. Note that a halftone screen, the density distribution thereof is such that light transmitting portions and light shielding portions are alternately arranged, can provide a density distribution equivalent to the one shown in FIG. 1 (d) when the halftone screen is arranged in such a manner that the same is not in contact with the photosensitive material.

Referring to FIG. 2, a difference between the maximum value and the minimum value of the screen density is referred to as "screen range" throughout the specification and the claims. A difference between the maximum value and the minimum value of an original density is referred to as "original range" throughout the specification and the claims.

Original ranges of the originals to be reproduced in practice are different from each other to reproduce of an original having an original range out of a screen range in order to acquire a halftone negative image in a precise tone requires a special controlling method of exposure.

One of the methods for controlling contrast of a halftone negative image in corresponding to various originals in such a halftone photography using a process camera is a sub-exposure method. This method generally includes a main exposure and either or both of a bump exposure or/and a flash exposure.

Referring to FIG. 3, the main exposure is carried out as follows. An original 35 is placed on an original table (not shown) of a process camera. A film 37 and a contact screen 36 put on the original 35 side of the film 37 are supported by a vacuum board (not shown) or the like above the original 35. A lens 11 for forming an image of the original on the film 37 is provided between the original 35 and the film 37. The space between lens holders supporting the lens 11 and the original 37 is light-shielded from the outside by bellows 8, thereby forming a dark space. A flash lamp 14 for use in a flash exposure which will be described later is provided on the upper surface of the lens holder. A light source 19 for reflection is provided at the side of the bellows 8 above the original. When the original 35 is transparent, for example, such as a film, a light source 38 provided below the original 35 is used.

The light emitted from the light source 19 is reflected by the original 35. The reflected light forms through the lens 11, an image of the original 35 on the film 37. The flash lamp 14 is not used. An image is formed on the film 37 through the contact screen 36. The image has various sizes of dots corresponding to the tones of the contrast of the image of the original 35.

The flash exposure is for making contrast low between a shadow portion and a middle tone portion of an original. Referring to FIG. 4, in the flash exposure, the film 37 is uniformly exposed through the contact screen 36 by the flash lamp 14 provided on the lens holder of the bellows 8.

A bump exposure is for making contrast high between a highlight portion and a middle tone portion of an original. Referring to FIG. 5, the contact screen is removed from the original 37. The original 35 is illuminated by the light sources 19 or 38 and the reflected light or the transmitted light reaches the film 37.

Referring to FIG. 6, the flash exposure has the following effects. Suppose that a latent image shown by the curve 41 of FIG. 6 is formed through the main exposure. The flash exposure increases the exposure amount as shown by the broken curve 42. As a result, a part of the latent image reaches the integral exposure amount to form dots 43a and 43b. The dot 43b is a plan view of the formed dot. Only the dots of the middle to the lowest tone grow through the flash exposure. A shadow portion has a lower contrast and the screen range is enlarged.

Referring to FIG. 7, the bump exposure has the following effects. The exposure amount of the bump exposure is about 2-10% of the main exposure amount. In the bump exposure, as an original density is increased, a smaller amount of light is applied to a film. As a result, a middle tone portion and a highlight portion are exposed to a larger extent because the corresponding portions of the original have low densities. Therefore, the dot area of latent images 45a and 45b of the middle tone to the largest dot formed by the main exposure is increased, resulting in the dots having the larger area as latent images 44a and 44b. The bump exposure makes high the contrast in the highlight portion and reduces the screen range.

The bump exposure is in particular effective for reproducing precise tones of highlight regions and for eliminating dots from a white portion as in a case of an illustration drawn on a piece of white paper (a highlight process).

As the foregoing, in a sub-exposure method, a main exposure and one or both of a bump exposure and a flash exposure are properly combined, thereby obtaining a halftone negative image reproducing contrast of an original with fidelity.

As a conventional exposure control technique for implementing a sub-exposure method, for example, one is proposed by the present assignee and disclosed in *Printing Magazine* (1975, No. 8, Vol. 58, pp. 43-47) and another is disclosed in 35 years of *Image Techniques* (published on Oct. 11, 1978 pp. 93-99) published by the present assignee.

Referring to FIG. 9, a conventional exposure control apparatus includes a halftone data input unit 121 capable of inputting and setting basic data and original data.

The basic data includes basic data for main exposure, basic data for bump exposure and basic data for flash exposure.

Referring to FIGS. 8 and 9, for example, the basic data for main exposure includes a basic main exposure time $T_{BM}$ for reproducing a predetermined reference original in a desired dot percentage, and densities $B_{MIN}$ and $B_{MAX}$ corresponding to a dot percentage $A_H$ of a highlight region of the reference original and a dot percentage $A_S$ of a shadow portion, respectively when in halftone photography for the basic main exposure time $T_{BM}$. In general, 95% and 5% are considered desired values for $A_H$ and $A_S$, respectively.

The dot percentage represents a ratio of a halftone dot area to a unit area of an image formed on a film. If a screen range of a contact screen is $B_{DR}$, the equation $B_{DR} = B_{MAX} - B_{MIN}$ is established.

According to the tone characteristic curve 46 of the main exposure ($T_{BM}$) in FIG. 8, the reference original can be reproduced in the density range of $B_{MIN} - B_{MAX}$. As indicative by the curve 48, the maximum value of the density of the reproducible reference original is increased to $B'_{MAX}$ through the flash exposure ($T_{BF}$). On the other hand as indicated by the curve 47, the minimum value of the density of the reproduced reference original is increased to $B'_{MIN}$.

The basic data for a bump exposure includes a basic bump exposure time $T_{BH}$ and a reference original density $B'_{MIN}$ corresponding to an obtained dot percentage $A_H$ of a highlight region when subjected to bump exposure for the basic bump exposure time $T_{BH}$ after the halftone photography for the basic main exposure time $T_{BM}$.

The basic data for flash exposure includes a basic flash exposure time $T_{BF}$ and a reference original density $B'_{MAX}$ corresponding to an obtained dot percentage $A_S$ of a shadow region when subjected to flash exposure for the basic flash exposure time $T_{BF}$ after the halftone photography for the basic main exposure time $T_{BM}$.

The original data includes a highlight area density $D_{MIN}$ and a shadow area density $D_{MAX}$ from which a dot percentage of a highlight area $A_H$ and a dot percentage of a shadow area $A_S$ respectively, are obtained as a result of the halftone photography. A difference ($D_{MAX} - D_{MIN}$) between the shadow area density $D_{MAX}$ and the highlight area density $D_{MIN}$ denotes an original range $D_{DR}$.

The conventional exposure control apparatus further includes an exposure control device 125 containing an exposure operating device 127 for calculating a main exposure amount $T_M$, a bump exposure amount $T_H$ and a flash exposure amount $T_F$ based on the basic data and the original data to control exposure of the process camera.

The process camera includes an autofocus control circuit 30 and an automatic focusing device 32 for automatically adjusting focus based on set magnification m. The autofocus control circuit 30 includes an autofocus operating device 31. The magnification m is applied from the autofocus control circuit 30 to an exposure operating device 127. An f-number $F_{NO}$ and basic data $T_0$ for a line exposure are also accepted by the exposure operating device 127 to carry out an exposure operation.

The conventional exposure control apparatus operates as follows. The basic data and the original data are applied to the halftone data input unit 121. The exposure operating device 127 obtains the main exposure time $T_M$, and one or both of the flash exposure time $T_F$ and the bump exposure time $T_H$ through the operations based on the above-described equations (3)-(6). A prescribed exposure control is carried out based on the obtained values $T_M$, $T_F$ and $T_H$.

The operations of the values $T_M$, $T_F$ and $T_H$ are separately performed in the following two cases depending on a relation between the original range and the screen range.

(I) When the original range is larger than the screen range ($D_{DR} > B_{DR}$):

$$T_M = T_{BM} \cdot 10^A \ldots \quad (3)$$

wherein $A = D_{MIN} - B_{MIN}$.

$$T_F = T_{BF}(1 - 10^{-C})/(1 - 10^{-F}) \ldots \quad (4)$$

wherein $C = D_{Dr} - B_{DR}$, and $F = B'_{MAX} - B_{MAX}$.

(II) When the original range is smaller than the screen range ($D_{DR} > B_{DR}$):

$$T_M = T_{BM} \cdot 10^B \ldots \quad (5)$$

wherein $B = D_{MAX} - B_{MAX}$.

$$T_H = T_{BH} \cdot 10^D \cdot (1 - 10^C)/(1 - 10^{-E}) \ldots \quad (6)$$

wherein $D = D_{MIN} - B'_{MIN}$ and $E = B'_{MIN} - B_{MIN}$.

In actuality, corrections corresponding to the magnification m and a change of the common f-number $F_{NO}$ are added to these equations.

In general, the above-described conventional exposure control system has theoretically no problem provided that the exposure and the development can be strictly controlled. In actuality, however, quality of photosensitive material varies in sensitivity depending on a production lot. Also in an automatic development, activity of developer used therein varies to some extent. Furthermore, it is sometimes difficult to accurately measure a highlight area density or a shadow area density of the original data, which might result in that desired dot percentages $A_H$ and $A_S$ cannot be obtained of the portions corresponding to the highlight region and the shadow region of the halftone negative image obtained based on the basic data and original data.

In the above-described conventional method, the halftone photography is repeated after correcting the value $D_{MIN}$ or $D_{MAX}$ of the original in such a case. It is necessary to estimate the most suitable values of the original data $D_{MIN}$ and $D_{MAX}$ based on the result of the previous halftone photography. However, this estimation is so difficult that only an operator of considerable experience can make it accurately. In addition, a conventional apparatus requires the original data to be corrected in different manners depending on whether a photosensitive material for use is of a negative type or a positive type.

SUMMARY OF THE INVENTION

The present invention is made taking into consideration the above-described circumstances and is directed to a method of controlling exposure requiring no correction of original data $D_{MAX}$ and $D_{MIN}$ directly made by an operator in re-photographing when desired dot percentages $A_H$ and $A_S$ cannot be obtained and the method by which the desired dot percentage can be easily obtained in portions corresponding to a highlight area and a shadow area through re-photographing, and an apparatus therefor.

The method of controlling exposure according to the present invention is for controlling exposure of an original through a screen to a photosensitive material by calculating a main exposure amount, a bump exposure amount and a flash exposure amount based on basic data peculiar to the combination of the screen and the photosensitive material and original data depending on the original in a process camera, the basic data including a main exposure amount, a bump exposure amount and a flash exposure amount for reproducing a predetermined reference original on the screen in a predetermined dot percentage, and the method including the steps of, (a) preparing basic data and original data, (b) obtaining a dot image by exposing the original to the photosensitive material through the screen based on the prepared basic data and original data, (c) defining a resultant dot percentage correction value by obtaining a difference between dot percentages of the portions of the obtained dot image which portions corresponding to a highlight region and the shadow region of the original, respectively and the respective desired values and (d) correcting at least one of the main exposure amount the bump exposure amount and the flash exposure amount. In the above described method is evaluated by the dot percentages of the portions of the obtained dot image corresponding to the highlight region and the shadow region of the original. The difference between the desired finished image and the obtained image of the dot image is represented as a difference in the dot percentages. The difference in the dot percentages is directly used for correcting the exposure amount. The dot percentage can be easily obtained for both the original and the obtained dot image. This method requires no correction of original data by an operator estimating an effect beforehand. Therefore, it is possible to provide a method of controlling exposure by which a dot image having desired contrast can be easily formed irrespective of a technique of the operator.

According to another aspect of the present invention, the apparatus for controlling exposure of an original to a photosensitive material through a screen by calculating a main exposure amount, a bump exposure amount and a flash exposure amount based on basic data peculiar to the combination of the screen and the photosensitive material and original data depending on the original, the basic data including a main exposure amount, a bump exposure amount and a flash exposure amount for reproducing a predetermined reference original on the photosensitive material in a predetermined dot percentage, the apparatus includes (a) means for preparing basic data and original data, (b) means for obtaining a dot image by exposing the original to the photosensitive material through the screen based on the prepared basic data and original data, (c) means for defining a resultant dot percentage correction value by obtaining differences between dot percentages of portions of the obtained dot image corresponding to a highlight region and a shadow region of the original and the respective desired values, and (d) means for correcting at least one of the main exposure amount, the bump exposure amount and the flash exposure amount based on the resultant dot percentage correction value and the basic data.

In the above-described apparatus, the obtained dot image is evaluated based on the dot percentages of the portions of the obtained dot image corresponding to the highlight region and the shadow region of the original. The difference between the predetermined finished image and the obtained dot image is represented as a dot percentage correction value as a difference in the dot percentages. The difference in the dot percentages is used for correcting an exposure amount. The dot percentage can be easily obtained for the original and the obtained dot image. This apparatus requires no correction of the original data by the operator estimating the effect beforehand. Therefore, it is possible to provide an apparatus of controlling exposure by which a dot image having predetermined contrast can be easily formed irrespective of a technique of the operator.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram showing the principle of formation of a dot by a flash exposure.

FIG. 7 is a schematic diagram showing the principle of formation of a dot by a bump exposure.

FIG. 8 is a graph showing tone characteristic curves of a main exposure, a bump exposure and a flash exposure.

FIG. 15 is a flow chart showing the schematic processes of the method of controlling exposure according to the present invention.

FIGS. 16 and 17 are schematic flow charts of a program executed in a CPU of the apparatus for controlling exposure according to the present invention.

DESCRIPTION OF THE PREFERRED EMBODIMENTS

Figure 9:
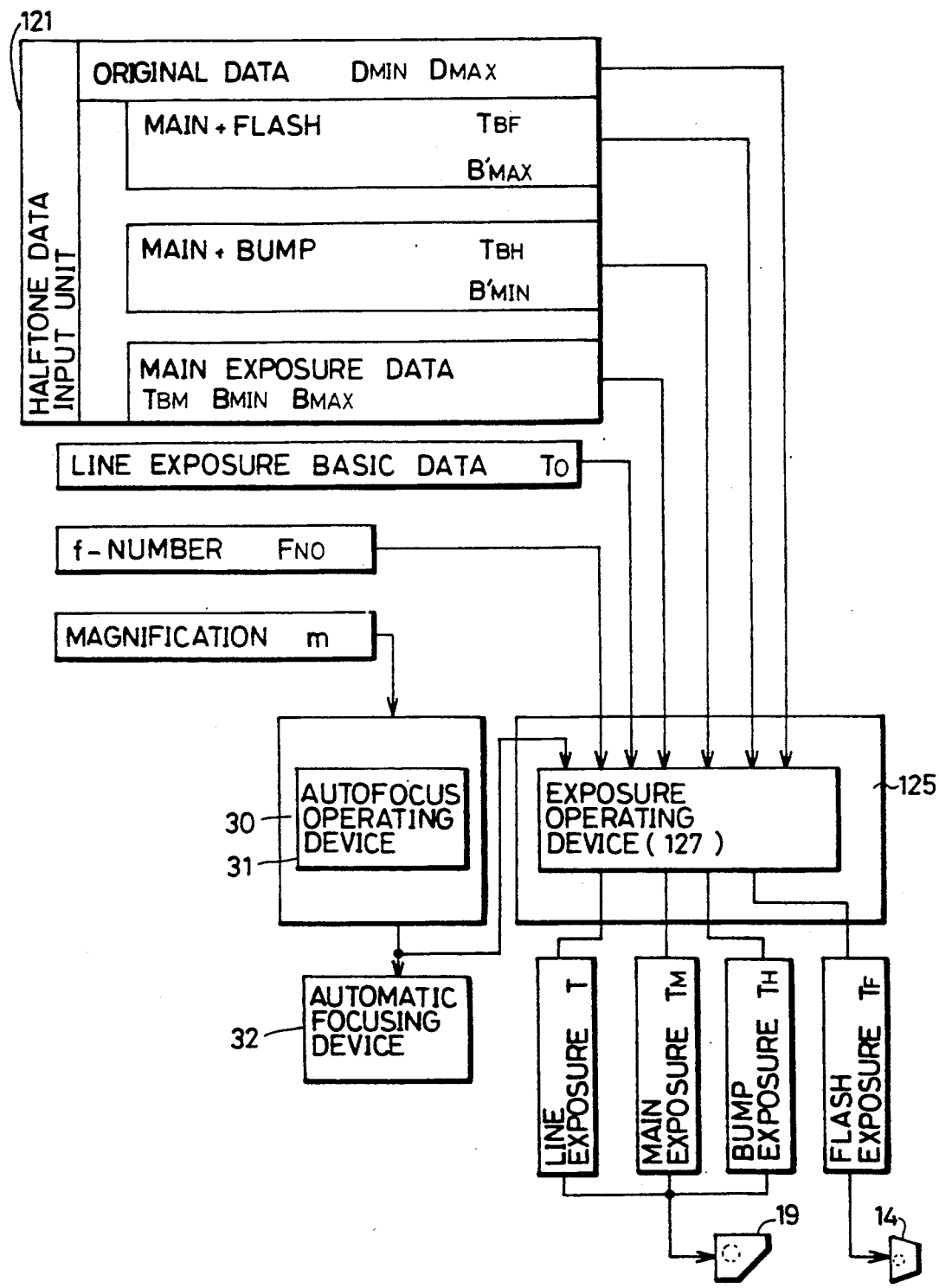
FIG. 9 is a block diagram of a conventional apparatus for controlling exposure.
Figure 10:
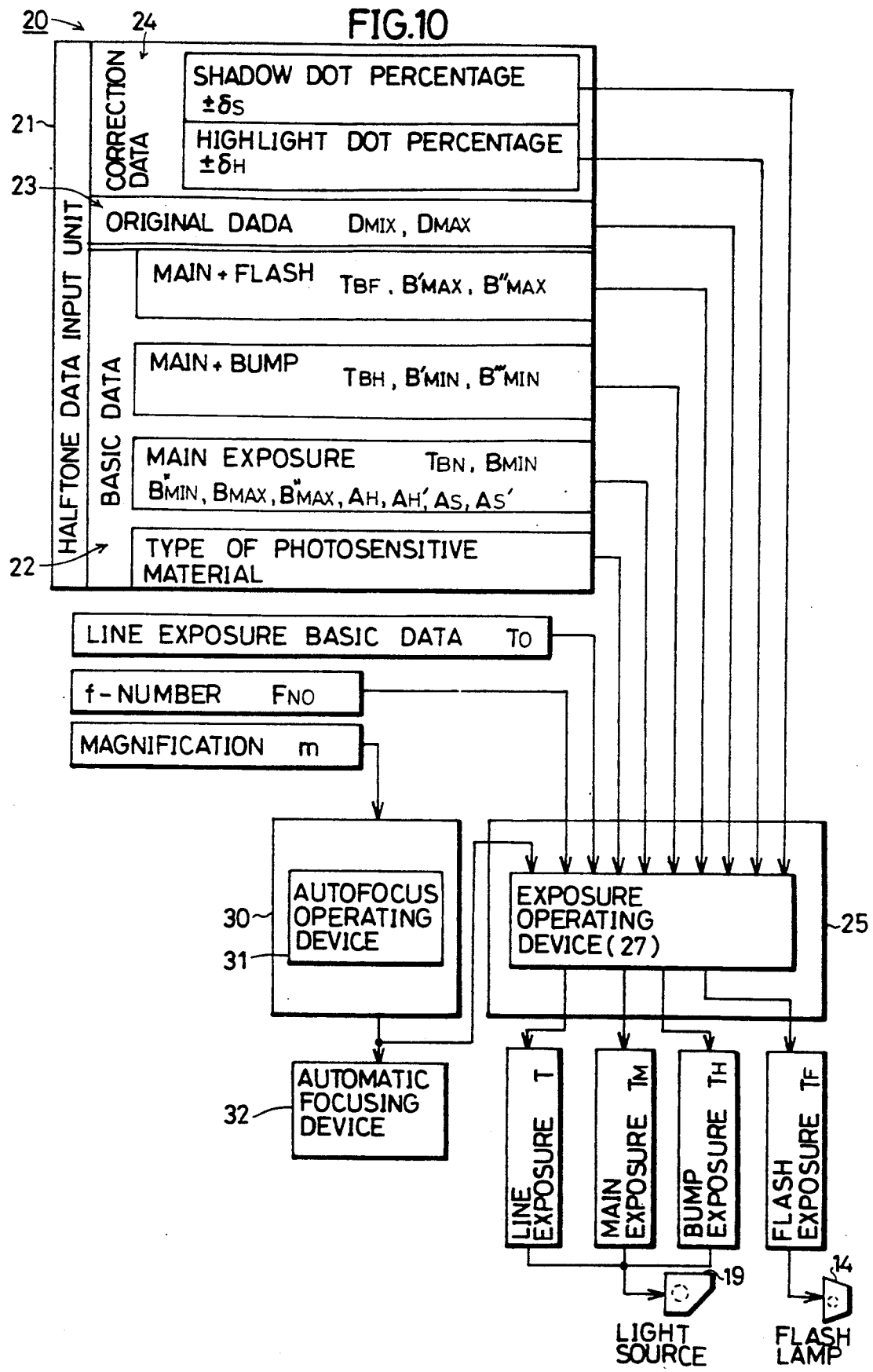
FIG. 10 is a block diagram of an apparatus for controlling exposure according to the present invention.

FIG. 10 is a block diagram of the exposure control apparatus according to the present invention. The apparatus shown in FIG. 10 differs from the conventional apparatus shown in FIG. 9 in that it includes a halftone data input unit 21 in place of the conventional halftone data input unit 121 capable of inputting data also including data for correction, and an exposure control device 25 having an exposure operating device 27 in place of the exposure operating device 125 for carrying out an operation for exposure based on the data for correction, basic data and original data. The same reference numerals and names are given to the same parts in FIGS. 9 and 10. The functions thereof are also the same, and therefore, no detailed descriptions thereof will be given here.

The halftone data input unit 21 comprises an input unit 22 for basic data, an input unit 23 for original data and an input unit 24 for correction data.

The input unit 22 for basic data receives as inputs basic data for a main exposure, basic data for bump exposure and for correcting a highlight region, basic data for flash exposure and for correcting a shadow region, and data indicating whether a photosensitive material in use is of a positive type or a negative type. These basic data are applied to the exposure operating device 27 and used as a basis for the calculation for obtaining a dot image of desired contrast.

Figure 14:
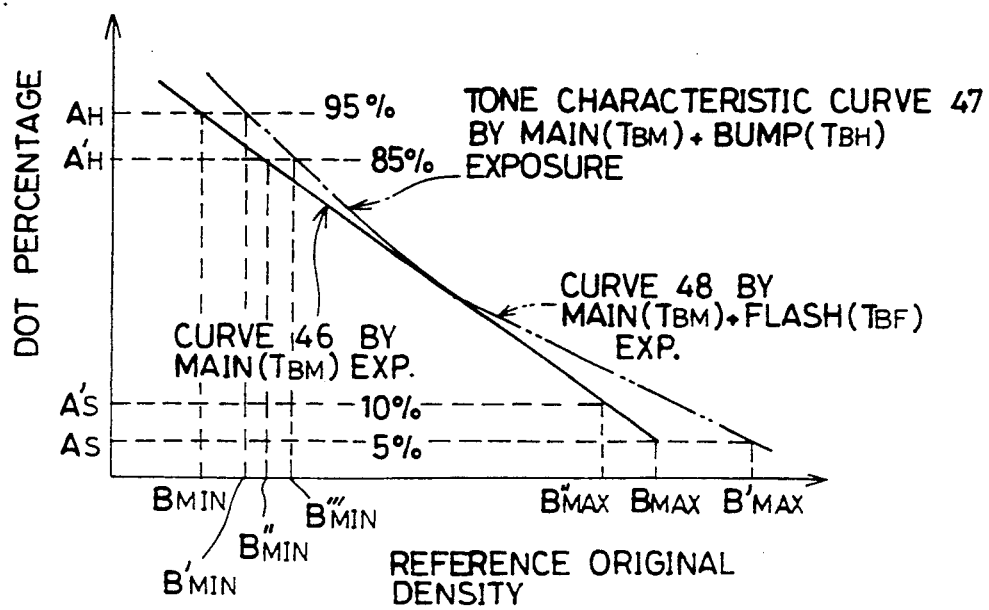
FIG. 14 is a graph showing tone characteristic curves describing the method of controlling exposure according to the present invention for a negative photosensitive material.

Referring to FIG. 14, the basic data for main exposure, the basic data for bump exposure and correction of a highlight region and the basic data for flash exposure and correction of a shadow region are obtained beforehand by using a predetermined reference original for each of the used contact screen.

Referring to FIG. 14, the density of the reference original and the dot percentage of the dot image obtained through the main exposure have the relation as indicated by the curve 46. In general, the desired dot percentage $A_H$ corresponding to the highlight region of the reference original is selected to 95%. The density $B_{MIN}$ of the reference original corresponding to the dot percentage $A_H$ can be found as an intersection point between the straight line A (dot percentage) = $A_H$ fixed and the curve 46. In general, the dot percentage $A_S$ of the dot image corresponding to the shadow region of the reference original is selected to 5%. Like the density $B_{MIN}$, the density $B_{MAX}$ of the reference original corresponding to the dot percentage $A_S$ can be found as the intersection point between the straight line A = $A_X$ and the curve 46.

Like the dot percentages $A_H$, $A_S$, a dot percentage $A_H'$ little smaller than $A_H$ and a dot percentage $A_S'$ little larger than the dot percentage $A_S$ are selected beforehand. In case of this embodiment, 85% and 10% are selected for $A_H'$ and $A_S'$ respectively. Basic data $B''_{MIN}$ for the main exposure can be found as the intersection point between the straight line A = $A_H'$ and the curve 46. Basic data $B''_{MAX}$ for the main exposure can be found as the intersection point between the straight line with A = $A_S'$ and the curve 46. As shown in FIG. 14, the tone characteristics of the dot image obtained from the reference original through the main exposure ($T_{BM}$) and the bump exposure ($T_{BH}$) is expressed by the curve 47. Basic data $B'_{MIN}$ for the bump exposure can be obtained from the intersection point between the straight line A = $A_H$ (=95%) and the curve 47. Basic data $B''_{MIN}$ for correcting the bump exposure can be obtained from the intersection point between the straight line $A = A_H'$ $(= 85\%)$ and the curve 47.

The main exposure ($T_{BM}$) and the flash exposure ($T_{BF}$) results in the tone characteristics of the dot image obtained from the reference original shown by curve 48. Basic data $B'_{MAX}$ for the flash exposure can be obtained from the intersection point between the straight line $A = A_S (= 5\%)$ and the curve 48. Referring again to FIG. 10, the main exposure data include $T_{BM}$, $B_{MIN}$, $B''_{MIN}$, $B_{MAX}$, $B''_{MAX}$, $A_H$, $A_H'$, $A_S$, and $A_S'$. The basic data for the bump exposure and for correcting the same include $T_{BH}$, $B'_{MIN}$ and $B'''_{MIN}$. The basic data for the flash exposure and for correcting the same includes $T_{BF}$, $B'_{MAX}$ and $B'_{MAX}$.

The original data maintained in the original data input unit 23 includes a density $D_{MIN}$ of a highlight region of an object original and a density $D_{MAX}$ of a shadow region.

The correction data maintained in the correction data input unit 24 includes resultant dot percentage correction values $\pm \delta_H$ and $\pm \delta_S (\%)$ indicative of the e or insufficient amounts with respect to a desired value in case a desired dot percentage $A_H$ cannot be obtained in the highlight region of the dot image or when a desired dot percentage $A_S$ cannot be obtained in a shadow region of the dot image. $\delta_H$ represents a resultant dot percentage correction value corresponding to a highlight region of the original and $\delta_H$ represents a resultant dot percentage correction value corresponding to a shadow region of the original. In order to represent the difference between the obtained dot image and a desired finished image, a value is used which indicates the excessive or insufficient amounts in percentage of the dot percentages. This is because one in the field of processing work can easily express this difference in a dot percentage and can also easily recognize the meaning thereof. That is, the control of exposure using such indication is practical for processing work.

Figure 11:
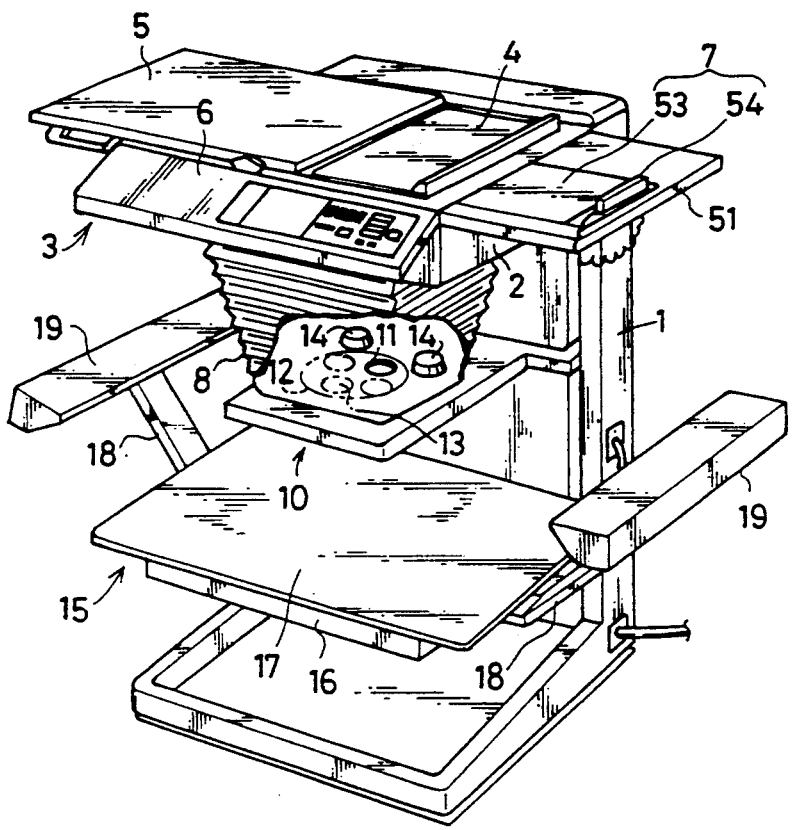
FIG. 11 is a perspective view of a process camera for implementing the method of controlling exposure according to the present invention.

FIG. 11 is the perspective view of a vertical process camera including the exposure control apparatus according to the present invention. The vertical process camera comprises an L-shaped base frame 1, an open frame 2 provided at the top of the base frame 1 protruding therefrom and having an opening, an exposure frame 3 provided on the open frame 2, a lens holder 10 attached to the frame 1 in vertically movable manner below the open frame 2, bellows 8 for light shielding the space between the lens holder 10 and the open frame 2 from the outside, and an original frame 15 attached in a vertically movable manner to the base frame 1 below the lens holder 10 and on which an original is to be placed.

The exposure frame 3 comprises a glass plate 4 provided at the right side of the upper surface of the open frame 2, a vacuum board 5 provided leftward of the upper surface of the open frame 2, an operation panel 6 provided at the front portion of the exposure frame 3 and containing an exposure control apparatus according to the present invention, and a densitometer 7 provided at the rightside portion of the open frame 2 for measuring a density and a dot percentage of each part of an original and a density and a dot percentage of a halftone dot image.

The glass plate 4 and the vacuum board 5 are rotatable around its right side, and an axis of rotation provided slightly leftward from the center of the opening provided on the open frame 2, respectively. The glass plate 4 and the vacuum board 5 can selectively cover the opening of the open frame 2 to be placed on the surface on which the image of the original is formed.

A detachable lens 11 is attached at the center of the lower surface of the lens holder 10 for covering a predetermined magnification. Provided in the lens holder are a filter turret 12 having a plurality of color separation filters 13 and a pair of flash lamps 14 for a flash exposure.

The original frame 15 comprises an original table 16 attached up-down in a vertically movable manner to the base frame 1 on which an original is to be placed, a glass plate 17 for pressing the original placed on the original table 16, a pair of light sources 19 for reflection attached to the original table 16 by means of arms 18, and a light source for transmission (not shown) provided under the original table 16.

An appropriate combination of the positions of the original table 16, the lens holder 10, and the types of the lens 11 allows photographing of an original at a desired magnification and exposure of the image of the original to a film held on the vacuum holder 5.

Figure 12:
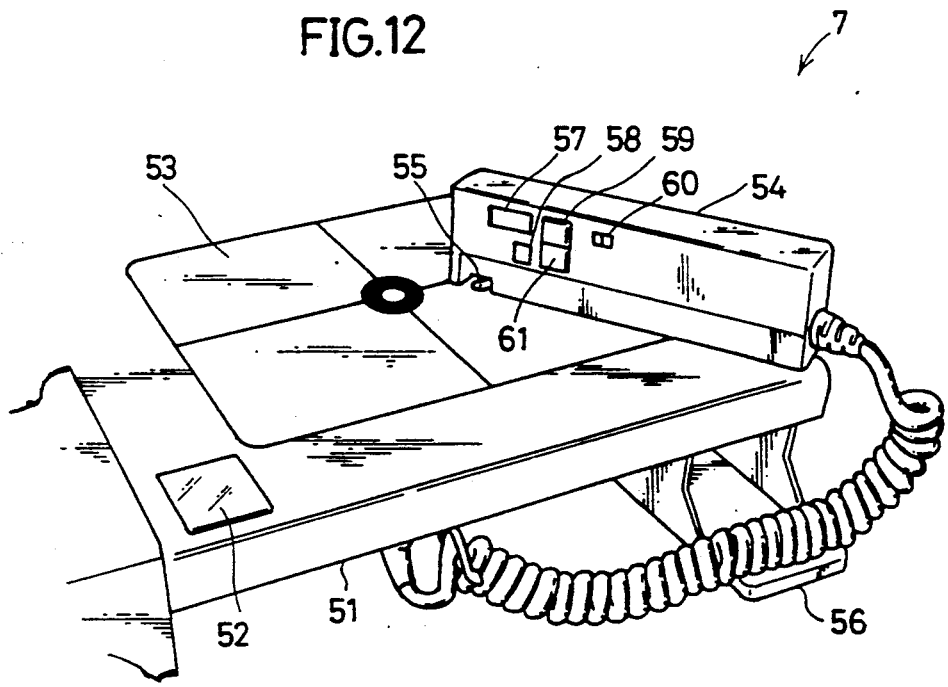
FIG. 12 is an enlarged perspective view of a densitometer for the process camera shown in FIG. 11.

Referring to FIG. 12, the densitometer 7 comprises a working table 51 attached at the right side of the open frame 2, a light measuring probe 54 connected to the exposure control apparatus according to the present invention through a cord, a light emitting window 53 provided on the upper surface of the working table 51, a storing case 56 provided under the working table 51 for storing the light measuring probe 54, and a reference sheet 52 provided on the working table 51 for defining a reference density in measuring a reflection density of the original.

The light measuring probe 54 is provided with an aperture 55 for receiving the light from the original, a display window 57 for displaying the original density or a dot percentage calculated based on the light received by the aperture 55, a clear button 58 for calibration of the light measuring probe 54 and for resetting a measured value, a transfer button 59 for designating transfer of the measured value to the exposure control apparatus according to the present invention, a switch 60 for switching between the measurement of the reflection density and the measurement of the transmission density, and a measurement button 61 for starting the measurement of density or dot percentage.

Figure 13:
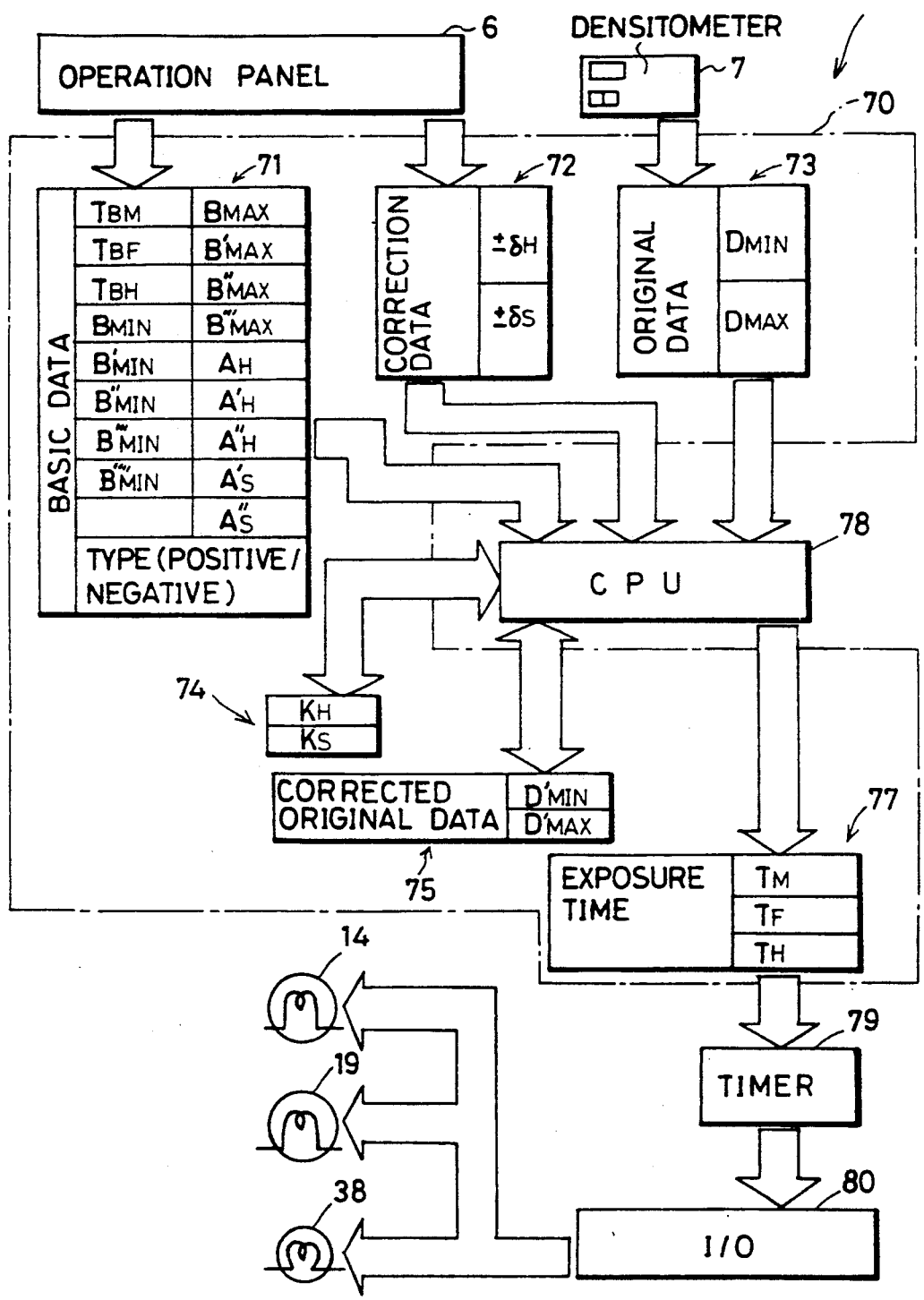
FIG. 13 is a schematic circuit block diagram of the apparatus for controlling exposure according to the present invention.

In actuality, the apparatus for controlling exposure according to the present invention can be implemented by using a CPU (Central Processing Unit). FIG. 13 is a circuit block diagram of the apparatus for controlling exposure, by using the CPU according to the present invention and its peripheral devices. Referring to FIG. 13, the exposure control device 25 includes a CPU 78 for performing main processings for controlling exposure such as operation of an exposure time, a memory 70 connected to the CPU 78, the operation panel 6 and the densitometer 7, for storing basic data, operation result and the like, a timer 79 for receiving data concerning the exposure times from the memory 70 to control a lighting time of the flash lamp 14, the light source 19 for reflection and the light source 38 for transmission, and an I/O (input/output) interface 80 for interfacing the flash lamp 14, the light sources 19 and 38 and the timer 79.

The memory 70 includes a work area 71 for storing basic data, a work area 72 for storing correction data, a work area 73 for storing original data, a work area 74 for storing correction coefficients, a work area 75 for storing the original data obtained as a result of the correction, and a work area 77 for storing a main exposure time $T_M$ obtained as a result of the operation, a flash exposure time $T_F$ and a bump exposure time $T_H$.

FIG. 15 is a flow chart describing one example of the procedures of the halftone photography by this process camera. Referring to FIGS. 10 to 15, the procedure according to the method of controlling exposure according to the present invention is as follows.

Referring to FIG. 15 in particular, in step S1, all the basic data are input to the work area 71 of the memory 70 through the operation panel 6 (FIG. 13). The data concerning the main exposure, the bump exposure and the flash exposure in the basic data are obtained beforehand for each of used the contact screen as described above. In addition, a type of a photosensitive material is input corresponding to a photosensitive material for use.

In step S2, the operator puts an original on the original frame 15 of the process camera. That is, the original is placed on the original table 16 of FIG. 11 and the glass plate 17 is put on the original. A photosensitive material is put on the vacuum board 5 and the contact screen is placed thereon to be attached thereto. The photosensitive material and the contact screen are held by suction of the vacuum board 5. The operator turns the vacuum board 5 by means of the grip of the vacuum board 5 to locate the photosensitive material and the contact screen at the opening of the open frame 2.

In step S3, the magnification m and the original data (the highlight region density $D_{MIN}$ of the and the shadow region density $D_{MAX}$) are input using the operation panel 6 and the densitometer 7. The original data is stored in the work area 73 of the memory 70 shown in FIG. 13.

Referring to FIG. 12, the measurement of the original data is carried out using the densitometer 7 as follows. The procedure of the measurement varies depending on whether the original reflects light like as a photograph does (reflection original) or it transmits light like a film does (transparent original). The procedures will be described in the following.

(1) Measurement of a density of a reflection original
  (a) The switch 60 is set to the reflection side.
  (b) The aperture 55 is located on the reference sheet 52 and both the clear button 58 and the measurement button 61 are pressed, thereby calibration is done.
  (c) The aperture 55 is located at the part to be measured of the original and the measurement button 61 is pressed. The light measuring probe 54 makes a measurement of the density of the portion at which the aperture 55 is placed. The measured value is displayed on the display window 57.
  (d) The operator presses the transfer button 59. The measured value stored in the light measuring probe 54 is transferred to the device for controlling exposure of the process camera.
  (e) The measurement is carried out for both the highlight region and the shadow region of the original.

(2) Measurement of a density of a transparent original
  (a) The switch 60 is set to the transmission side.
  (b) The light table 53 emits light. The operator locates the aperture 55 at the center of the light table 53. The operator presses both the clear button 58 and the measurement button 61 with the aperture located on the same position, thereby calibration is done.
  (c) The position to be measured of the original is located at the center of the light table 53. The operator locates the aperture 55 right above the portion to be measured of the original and presses the measurement button 61. The probe 54 measures the density of the portion to be measured of the original. The measured value is displayed on the display window 57.
  (d) The operator presses the transfer button 59. The measured value is transferred to the device for controlling exposure of the process camera from the probe 54.
  (e) The measurement is carried out for both the highlight region and the shadow region of the original.

The original data $D_{MIN}$ and $D_{MAX}$ are measured for the reflection original or the transparent original as the foregoing, and data are stored in the work area 73 of the memory 70 shown in FIG. 13.

In step S4, the autofocus control device 30, the autofocus operating device 31 and the automatic focusing device 32 operate. The lens holder 10 and the original frame 15 shift to the position at which the desired magnification m input in stp S3 is achieved. The image is formed on the photosensitive material set at the opening of the open frame 2.

In step S5, the exposure operating device 27 (CPU 78 in FIG. 13) shown in FIG. 10 obtains the main exposure time $T_M$ and the flash exposure time $T_F$ or the bump exposure time $T_H$. These values can be obtained through predetermined operations of the basic data stored in the work area 71 and the original data stored in the work area 73 of the memory 70 shown in FIG. 13. The results obtained through the operations are displayed on the operation panel 6 in step S6. The operation result is also stored in the work area 77 of the memory 70 shown in FIG. 13.

In step S7, the operator presses a predetermined button of the operation panel 6, thereby starting the main exposure. When the original is reflective, the light source 19 shown in FIG. 10, 11 and 13 lights for a predetermined time period. That is, referring to FIG. 13, when the light source 19 lights, the exposure time $T_M$ stored in the work area 77 is set to the timer 79. The timer 79 counts down the set time. When the count of the timer 79 reaches "0" the light source 19 put out through the I/O 80, thereby performing the main exposure.

In step S8, the operator makes the determination as to whether the flash exposure or the bump exposure is required in view of the operation results displayed in step S6. When the determination is made that the flash exposure is necessary, the procedure goes to step S9 and otherwise it goes to step S10.

In step S9, the operator presses the button for starting the flash exposure (not shown) on the operation panel 6. The flash lamp 14 lights for the flash exposure time $T_F$ obtained through the operation to carry out the flash exposure. The flash lamp 14 is controlled by the timer 79 and the I/O 80 similarly to the light source 19.

In step S10, the vacuum board 5 is again turned open under the safety light and the contact screen is on the vacuum board 5 because the contact screen is not used in the bump exposure. The vacuum board 5 with only the photosensitive material set thereon is again turned to cover the opening on the open frame 2. The procedure goes to step S11.

In step S11, the light source 19 is again lighted for the bump exposure time $T_H$. This lightening is also controlled by the timer 79 and the I/O 80.

The procedure goes to step S12 from both steps S9 and S11. In step S12, the exposed photosensitive material is developed. Dot percentages of the highlight region and the shadow region of the dot image obtained through the development are measured by using the densitometer 7 shown in FIG. 12. The obtained dot image is evaluated based on the obtained dot percentages. It is to be noted that the densitometer 7 is also capable of measuring a dot percentage of a dot image.

The procedure goes to step S13 wherein the operator makes the determination as to whether the correction of the exposure amount should be made or not. When the determination is made that the correction is unnecessary, which means the obtained dot image in step S12 is acceptable, the halftone photography of the object original is completed. When it is determined that the correction is necessary, the procedure goes to step S14.

In step S14, the operator inputs correction values $\pm\delta_H$ and $\pm\delta_S(\%)$ in the correction data input unit 24 shown in FIG. 10 (the operation panel 6 and the work area 72 shown in FIG. 13) corresponding to excessive or insufficient amounts of the obtained dot percentages for a desired value. The procedure goes to step S15.

In step S15, a predetermined calcination is adopted corresponding to the correction value input in step S14 and the original data $D_{MIN}$ and the original data $D_{MAX}$ are corrected in accordance with the calculation to obtain new original data $D'_{MIN}$ and $D'_{MAX}$. The obtained values are stored in the work area 73 of FIG. 13. At this time, a review of the basic flash exposure time $T_F$ is also performed.

After step S15, the procedure goes back to step S5. In step S5, the operation of an exposure time is again performed based on the corrected original data $D'_{MIN}$ and $D'_{MAX}$ stored in the work area 73. The obtained exposure time is displayed on the operation panel 6 and is also stored in the work area 77 shown in FIG. 13.

The processings in steps S9–S13 are carried out thereafter. The halftone photography of this original finishes when a dot image having a desired dot percentage is obtained in step S13.

The above descriptions, the descriptions of the main exposure and the bump exposure in particular, are made in a case where the original is reflective. When the original is transparent, the light source 19 is replaced by the light source 34.

Description will be made in the following of a method of obtaining a main exposure amount $T_M$, a flash exposure amount $T_F$ and a bump exposure amount $T_H$ taking a negative type photosensitive material as an example.

The exposure operating device 27 of FIG. 10 (CPU 78 in FIG. 13) corrects the original data $D_{MIN}$ and $D_{MAX}$ stored in the original data input unit 23 of FIG. 10 (the work area 73 in FIG. 13) using the following equations based on the resultant dot percentage correction values $\pm\delta_H$ and $\pm\delta_S$ set in the correction data input unit 24 (the work area 72 of FIG. 13) in order to obtain desired dot percentages of the portion corresponding to the highlight region and the portion corresponding to the operating region.

$$D'_{MIN}=D_{MIN}\pm K_H \cdot \delta_H$$

$$D'_{MAX}=D_{MAX}\pm K_S \cdot \delta_S \ldots \quad (7)$$

Herein, correction coefficients $K_H$ and $K_S$ are coefficients for converting the resultant dot percentage correction values to density correction amounts. These correction coefficients $K_H$ and $K_S$ can be determined as follows by using the basic data stored in the basic data input unit 22 of FIG. 10 (the work area 71 of FIG. 13).

(1) The correction coefficient $K_H$ of the highlight region is determined as follows.

(a) When the original range $D_{DR}$ is larger than the screen range $B_{DR}$, the correction coefficient $K_H$ is determined by the following equation:

$$K_H=(B''_{MIN}-B_{MIN})/(A'_H-A_H) \ldots \quad (8)$$

This equation is for converting a dot percentage to a density in accordance with the tone characteristic curve 43 of the main exposure shown in FIG. 14.

(b) When the original range $D_{DR}$ is smaller than or equal to the screen range $B_{DR}$, the correction coefficient $K_H$ is determined based on the following equation.

$$K_H=(B'''_{MIN}-B'_{MIN})/(A'_H-A_H) \ldots \quad (9)$$

This equation is for converting a dot percentage to an original density based on the tone characteristic curve 43 of the main exposure and the bump exposure shown in FIG. 14.

(2) The correction coefficient $K_S$ of the shadow region is obtained by the following equation.

$$K_S=(B_{MAX}-B''_{MAX})/(A_S-A'_S) \ldots \quad (10)$$

Figure 1:
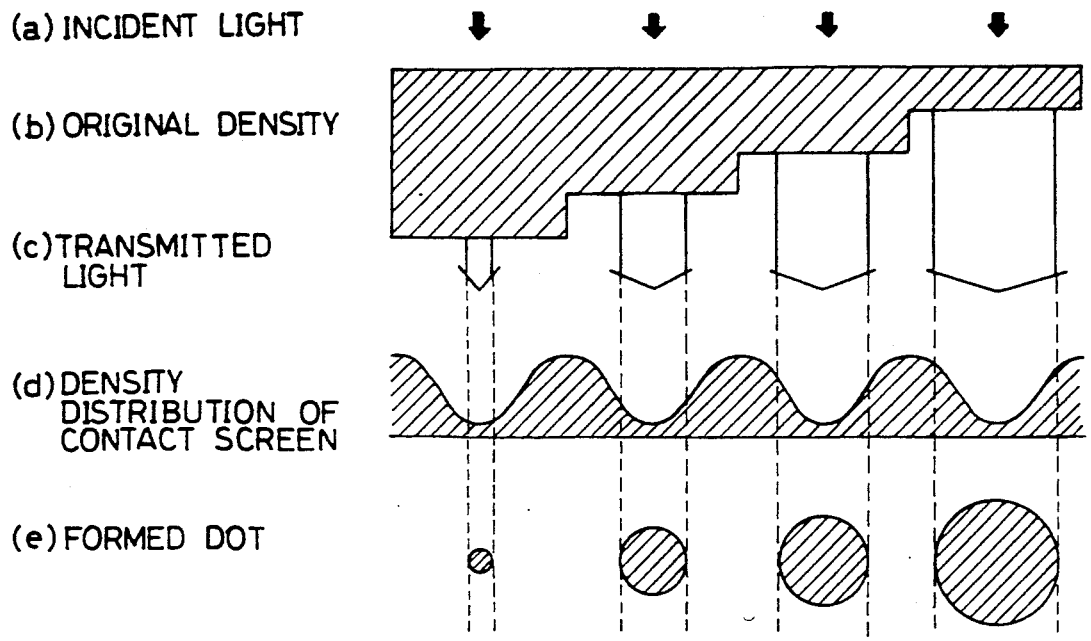
FIG. 1 is a schematic diagram describing the principle of photography using a contact screen.
Figure 2:
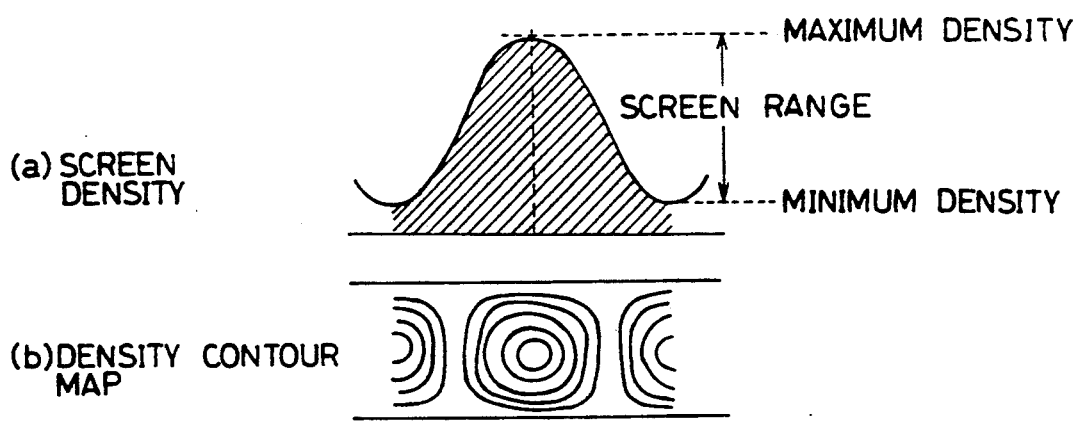
FIG. 2 is a schematic diagram of a density distribution of the contact screen.
Figure 3:
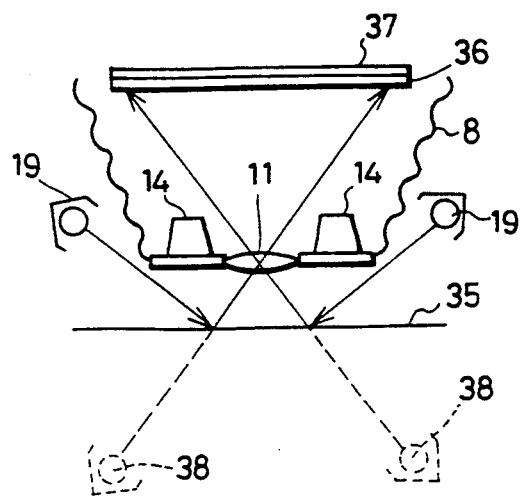
FIG. 3 is a schematic diagram showing the principle of the main exposure.
Figure 4:
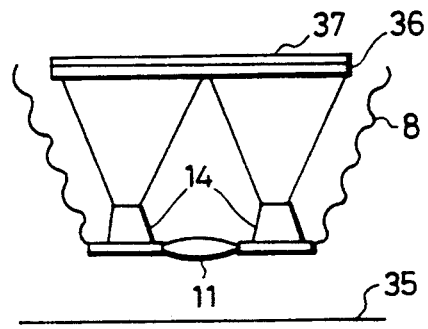
FIG. 4 is a schematic diagram showing the principle of the flash exposure.
Figure 5:
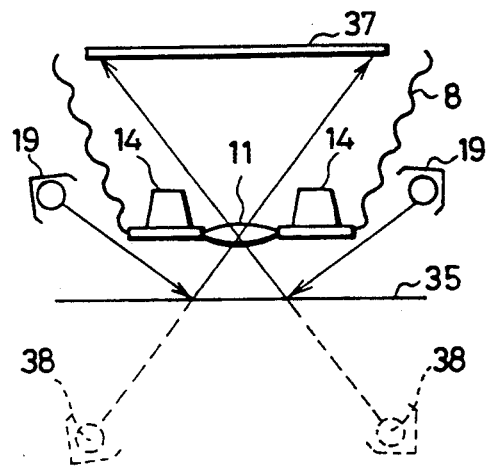
FIG. 5 is a schematic diagram showing the principle of the bump exposure.

This equation is referring to FIG. 4, for converting a dot percentage to an original density based on the tone characteristic curve 43 of the main exposure.

The correction coefficients $K_H$ and $K_S$ are independent of sensitivity of a photosensitive material and activity of a developer and are determined by a type of the contact screen alone. Therefore, the above-described correction coefficient can be calculated only from the value applied as basic data for the used contact screen.

It should be noted that the when the original range $D_{DR}$ is smaller than the screen range $B_{DR}$ correction coefficient $K_H$ varies according to a ratio of the basic main exposure time $T_{BM}$ to the basic bump exposure time $T_{BH}$. An error might be therefore caused in the exposure time when the (9) the correction coefficient $K_H$ is obtained only by above-described equation.

The following is proposed for solving this problem. In this proposal, a plurality of bump exposure times $T_{BH}$ different for each other are said for a predetermined main exposure time $T_{BM}$. A predetermined density $B_{MAX}-B'_{MIN}$ of the reference original and the correction coefficient $K_H$ are obtained beforehand from the tone characteristic curve determined corresponding to each bump exposure time. In the actual photographing, the bump exposure time having a density range mostly approximate to the original range $D_{DR}$ of the original is selected and the correction coefficient $K_H$ corresponding to that bump exposure time is used. The selection of the correction coefficient $K_H$ in this may achieves more precise exposure control.

In order to obtain the correction coefficients $K_H$ and $K_S$, basic data for correcting a highlight region and a shadow region should be input to the device in addition to the basic data required in the conventional method and for the conventional apparatus. In order to save this process, a predetermined constant can be used instead of calculating correction coefficients $K_H$ and $K_S$ for each exposure. The inventor made sure that the alternative of the constant to the correction coefficients $K_H$ and $K_S$ arose no problem in practice. Also, in this case also, it is proposed to set several predetermined values beforehand for the correction coefficient $K_H$ for correcting the highlight region corresponding to the correction coefficient $K_H$ obtained by using several bump exposure times. More accurate exposure control can be achieved by selecting the most suitable correction coefficient $K_H$ according to the original range $D_{DR}$ of the original among the plurality of constant correction coefficients $K_H$.

The main exposure amount and the bump exposure amount can be corrected only by substituting the original data $D_{MIN}$ and $D_{MAX}$ converted from the original data $D'_{MIN}$ and $D'_{MAX}$ after the correction obtained from the equation (7) in the equations (3), (5) and (6). The flash exposure amount, however, cannot be adequately corrected only by such a simple substitution.

That is, out of the equation (4) only the original range $D_{DR} (=D_{MAX}-D_{MIN})$ in the equation for determining the value C can be corrected by the equation. A desired dot percentage cannot be obtained of the portion of the dot image corresponding to the shadow region based on such a small change. For example, sensitivity of a photosensitive material and activity of a developer for an automatic developing machine vary at the time point at which the basic data is obtained and at the time point at which the actual exposure is performed. Being affected by the foregoing, there is a case where a desired dot percentage cannot be obtained of the portion corresponding to the shadow region based only on the basic data as it is. In this case, the basic flash exposure time $T_{BF}$ itself should be corrected. The following equation (11) should be introduced in place of the equation (4) accordingly.

$$T_F = T_{BF} \cdot 10^{\pm K_S \cdot \delta_S} (1-10^{-C})/(1-10^{-F}) \ldots \quad (11)$$

The item "$T_{BF} \cdot 10^{\pm K \cdot \delta_S}$" in the above-described equation can be referred to as a corrected basic flash exposure time. When $\delta_S=0$, the equation (11) coincides with the equation (4). The values C and F are common in the equations (11) and (4) and the correction coefficient $K_S$ is common in the equations (11) and (10). The difference between $D'_{MAX}$ and $D'_{MIN}$ is selected as $D_{DR}$ in the equation $C=D_{DR}-B_{DR}$.

Correction of the exposure amount is carried out when the photosensitive material is of a negative type.

Figure 18:
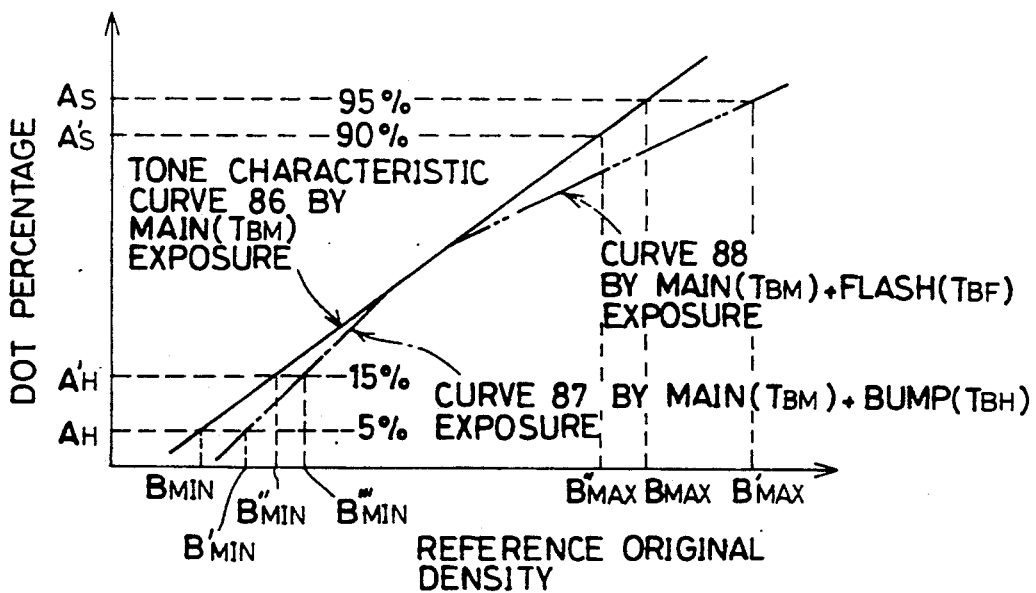
FIG. 18 is a graph showing tone characteristic curves of the main exposure, the bump exposure and the flash exposure for a positive photosensitive material.

When the photosensitive material is of a positive type, the exposure amounts are corrected as follows. FIG. 18 shows each basic data, the tone characteristic curve 86 of a main exposure, the tone characteristic curve 48 of a main exposure plus a flash exposure and the tone characteristic curve 47 of a main exposure plus a flash exposure when a photosensitive material is of a positive type. As is clear from the comparison between FIGS. 18 and 14, a relation between basic data (dot percentages) $A_H$ and $A'_H$ and a relation between dot percentages $A_S$ and $A'_S$ included in the equations (8), (9) and (10) for determining the correction coefficients $K_H$ and $K_S$ are reverse to those in a case where the photosensitive material is of a negative type. Therefore, when the photosensitive material is of a positive type, the signs of the correction coefficients $K_H$ and $K_S$ are opposite to those of a negative type.

An adequate correction can be therefore made by using the equations (8), (9), and (10) without taking into consideration that the photosensitive material is of a positive type or a negative type by calculating the correction coefficients $K_H$ and $K_S$ each time. A correction operation as follows is required when constants are used in place of each calculation of the correction coefficients $K_H$ and $K_S$. That is, when the photosensitive material is of a positive type, the signs of the correction coefficients $K_H$ and $K_S$ should be inverted in the calculation performed in the exposure operating device 27. The absolute values of these correction coefficients $K_H$ and $K_S$ are substantially determined by the contact screen in use. The values of the correction coefficients $K_H$ and $K_S$ have their signs changed according to the type of the photosensitive material in use.

Figure 17:
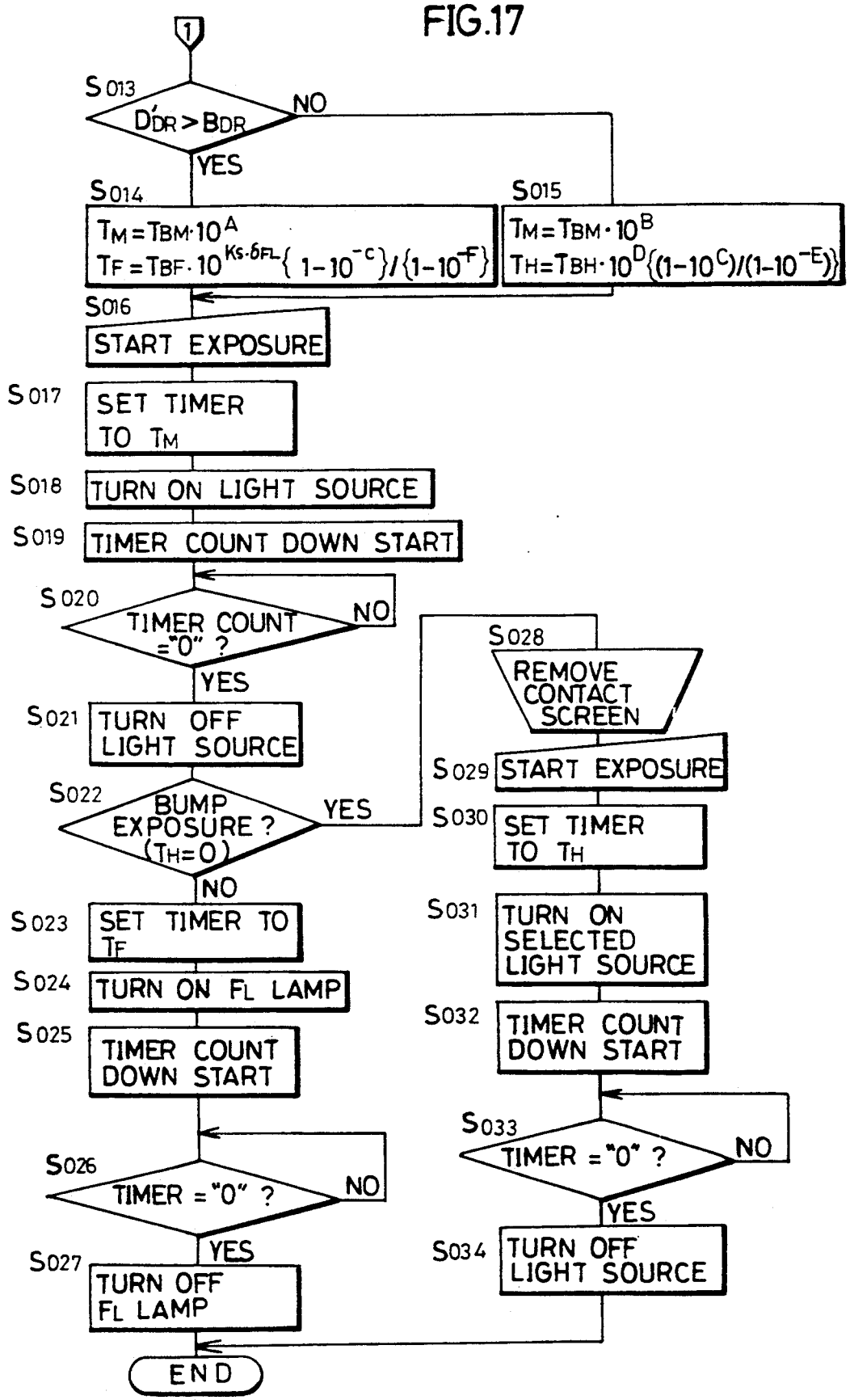

FIGS. 16 and 17 are the flow charts of the program to be executed in the CPU 78 (FIG. 13) of the device for controlling exposure according to the present invention. In step S002, the densitometer 7 measures the original data. The measured values are stored in the work area 73 of the memory 70. The control proceeds to step S003.

In step S003, variables $K_{mh}$, $K_{ms}$ and $K_h$ are calculated according to the following equations:

$$K_{mh} = (B'''_{MIN} - B''_{MIN})/(A'_H - A''_H)$$

$$K_{ms} = (B'''_{MAX} - B''_{MAX})/(A'_s - A''_s)$$

$$K_h = (B'''_{MIN} - B'_{MIN})/(A_H - A''_H)$$

Subsequently in step S004, the screen range $B_{DR}$ and the original rage $D_{DR}$ of the original are calculated. The control goes to step S005.

In step S005, the determination is made as to whether $D_{DR}$ is larger than $B_{DR}$ or not. If the answer to the determination is YES, the control goes to step S006 and otherwise the control goes to step S007.

In step S006, the correction coefficient $K_H$ and $K_S$ are determined according to the following equations:

$$K_H = K_{mh}$$

$$K_S = K_{ms}$$

In step S007, the correction coefficients $K_H$ and $K_S$ are determined according to the following equations:

$$K_H = K_h$$

$$K_S = K_{ms}$$

After the steps S006 and S007, the control goes to step S008. In step S008, the correction values $\pm \delta_H$ and $\pm \delta_S$ are applied as inputs to the work area 72 (FIG. 13) through the operation panel 6. The control goes to step S009. In step S009, the values stored in the work area 71 which indicate the type of the photosensitive are checked material. The determination is made as to whether the photosensitive material in use is of a negative type or not. If the answer of the determination is YES, the control goes to step S010 and otherwise the control goes to step S011.

In step S010, the original data $D'_{MIN}$ and $D'_{MAX}$ after the correction are calculated according to the equation (7). The control goes to step S012 thereafter.

In step S011, the original data $D'_{MIN}$ and $D'_{MAX}$ after the correction are calculated according to the following equations:

$$D'_{MIN} = D_{MIN} \mp K_H \cdot \delta_H$$

$$D'_{MAX} = D_{MAX} \mp K_S \cdot \delta_S$$

The above equations are obtained by inverting the signs of the correction coefficients $K_H$ and $K_S$ in the equation (7). The control goes to step S012 thereafter.

In step S012, the original range $D'_{DR}$ is obtained as the difference between the original data $D'_{MAX}$ and $D'_{MIN}$ after the correction. The control goes to step S013 (FIG. 17).

In step S013, the determination is made as to whether the obtained original range $D'_{DR}$ is larger than the screen range $B_{DR}$ or not. If the answer of the determination is YES, the control goes to step S014 and otherwise the control goes to step S015.

In step S014, the main exposure amount $T_M$ and the flash exposure amount $T_F$ are determined according to the equations (3) and (11), respectively. The control goes to step S016.

When the control goes to step S015 from step S013, the main exposure amount $T_M$ and the bump exposure amount $T_H$ are determined according to the equations (5) and (6). The control goes to step S016.

In step S016, the operator presses the exposure starting button (not shown). The control goes to step S017.

In step S017, the value of the main exposure amount $T_M$ is set to the timer 79 (FIG. 13). The control goes to step S018.

In step S018, either the light sources 19 or 34 starts lightening. The control goes to step S019.

In step S019, the count down of the timer 79 is started. The control goes to step S020.

In step S020, the determination is made as to whether the counting of the timer 79 is finished or not (whether the count of the timer 79 is 0 or not). If the answer of the determination is YES, the control goes to step S021 and otherwise it goes back to step S020 to repeat the determination.

In step S021, either the light sources 19 or 38 is turned off because the necessary main exposure amount is obtained. The control goes to step S022.

In step S022, the determination is made as to whether the bump exposure is necessary or not. That is, it is determined as to whether the bump exposure amount $T_H$ is other than 0 or not. If the answer of the determination is YES, the control goes to step S028 and otherwise it goes to step S023.

In steps S023 to S027, the flash exposure is carried out. In step S023, the flash exposure amount $T_F$ is set to the timer 79. The control goes to step S024.

In step S024, the flash lamp 14 starts lightening. The control goes to step S025.

In step S025, the count down of the timer 79 is started. The control goes to step S026.

In step S026, the determination is made as to whether the counting of the timer 79 is finished or not. If the answer of the determination is YES, the control goes to step S027 and otherwise it goes to step S026.

In step S027, the flash lamp 14 is turned off because the necessary flash exposure amount is obtained. After step S027, the program ends.

When the control goes to step S028 from step S022, the bump exposure will be performed in and after step S028.

In step S028, the contact screen provided on the photosensitive material is removed because the contact screen is not used in the bump exposure. The control goes to step S029.

In step S029, the operator presses the key (not shown) for starting exposure. The control goes to step S030.

In step S030, the bump exposure amount $T_H$ is set to the timer 79. The control goes to step S031.

In step S031, the light sources 19 and 38 are turned on corresponding to the switch 60 of the densitometer 7 (FIG. 12) at the reflection and transmission side, respectively. The control goes to step S032.

In step S032, the count down of the timer 79 is started. The control goes to step S033. In step S033, the determination is made as to whether the counting of the timer 79 is finished or not. If the answer of the determination is YES, the control goes to step S034 and otherwise it goes back to step S033.

In step S034, either the light sources 19 or 38 is turned off, because the necessary bump exposure amount is obtained. Thereafter, the program ends.

In the method and the apparatus for controlling exposure according to the present invention, the main exposure amount, the flash exposure amount and the bump exposure amount are corrected as the foregoing. Correction of each exposure amount is performed based on a tone characteristic curve determining a relation between a reference original density and the obtained dot percentage. Therefore, the correction method according to the present invention allows not only the correction of variations in sensitivity of a photosensitive material and activity of a developer but also sufficiently effective correction of variations in measurement of a density of original data and the error in the setting of the original data as long as they are relatively small (in the range of $\pm 5 - 10\%$ for a desired dot percentage).

Disclosed in the foregoing description is the correcting method based on a type of a photosensitive material and an original range. In actuality, corrections are added to a magnification m and a change of an f-number $F_{NO}$ other than the correction clarified in the foregoing description. For example, when the magnification is m, the right sides of the equations (3) to (6) for obtaining the main exposure amount $T_M$, the flash exposure amount $T_F$ and the bump exposure amount $T_H$ are multiplied by the factor $(1+m)^2/(1+m_0)^2$, wherein m denotes a magnification at exposure and $m_0$, generally 100% is a magnification at which the basic data is obtained. The above-described correction of the magnification m is carried out because the illumination on the film is inverse proportion to $(1+m)^2$.

The correction of the exposure amount corresponding to the change of the f-number $F_{NO}$ is carried out by multiplying the right sides of the equations (3)–(6) by $F/F_0$, wherein F denotes an f-number at the exposure and $F_0$ denotes an f-number when the basic data is obtained.

In the foregoing, the description of the present invention is made taking as an example the device for controlling exposure contained in the vertical process camera. The present invention is not limited thereto and is applicable for example to the device for controlling exposure provided separately from the process camera.

As the foregoing, according to the present invention, a main exposure amount, a bump exposure amount and a flash exposure amount can be corrected by using excessive or insufficient amounts of the resultant dot percentages for a desired value as the correction values when a desired dot percentage $A_H$ or $A_S$ cannot be obtained in the highlight and shadow regions of the dot image, respectively. Unlike conventional apparatus and method, it is not necessary for an operator to correct the original data by evaluating a result of the halftone photography and estimating the correction value of the original data. As a result, approximately desired dots can be obtained irrespective of the technique of the operator. The type of the photosensitive material (negative/positive) is included in the basic data, and it is therefore unnecessary to consider the type of the photosensitive material in correction value.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of controlling exposure of an original to a photosensitive material through a screen by calculating a main exposure amount, a bump exposure amount and a flash exposure amount based on basic data peculiar to the combination of the screen and the photosensitive material and original data depending on the original in a process camera, said basic data including said main exposure amount said bump exposure amount and said flash exposure amount for reproducing a predetermined reference original on said screen with a desired dot percentage, the method comprising the steps of:
(a) preparing said basic data and said original data;
(b) obtaining a dot image by exposing said original to the photosensitive material through said screen based on said prepared basic data and original data;
(c) defining a resultant dot percentage correction value by obtaining differences between dot percentages of the portions of said obtained dot image and the respective desired values, said portions corresponding to a highlight region of said original, and to a shadow region of said original;
(d) correcting at least one of said main exposure amount, said bump exposure amount and said flash exposure amount based on said resultant dot percentage correction value and said basic data.

2. The method of controlling exposure according to claim 1, wherein said basic data includes:
basic data for a main exposure,
basic data for flash exposure,
basic data for bump exposure,
basic data for correcting a shadow region, and
basic data for correcting a highlight region.

3. The method of controlling exposure according to claim 2, wherein
said original data includes the density of the highlight region of said original and the density of the shadow region of said original, and
said step (a) includes the step of measuring the density of the highlight region of said original and measuring the density of the shadow region of said original.

4. The method of controlling exposure according to claim 3, wherein said step (c) comprises the steps of:
measuring a dot percentage of the portion of said obtained dot image, which portion corresponding to the highlight region of said original,
defining said resultant dot percentage correction value corresponding to the highlight region by obtaining the difference between said measured dot percentage of said obtained dot image and the desired dot percentage of the portion of said obtained dot image corresponding to the highlight region of said original, recalculating the density of said highlight region included in said original data based on said resultant dot percentage correction value and said basic data for correcting the highlight region.

5. The method of controlling exposure according to claim 4, wherein said step of recalculating the density of said highlight region includes the steps of:
comparing the original range of said original and the screen range of said screen, and
recalculating the density of said highlight region according to a predetermined calculations varying depending on said comparison results.

6. The method of controlling exposure according to claim 5, wherein
said predetermined calculation is defined by the equation:

where $D'_{MIN} = D_{MIN} \pm K_H \cdot \delta_H$ $D'_{MIN}$ denotes the density of the highlight region of said original after the correction included in said original data, $D_{MIN}$ denotes the density of the highlight region of said original after the correction included in said original data, $K_H$ denotes a predetermined correction coefficient peculiar to the screen and $\delta_H$ denotes said defined resultant dot percentage correction value with respect to the highlight region, and
said correction coefficient $K_H$ is determined according to an equation varying depending on said comparison result.

7. The method of controlling exposure according to claim 3, wherein said step (c) includes the steps of:
measuring the dot percentage of said portion of said obtained dot image corresponding to the shadow region of said original,
defining said resultant dot percentage correction value corresponding to the shadow region image by obtaining the difference between said measured dot percentage of said obtained dot image and the desired dot percentage of the portion corresponding to the shadow region of said original,
recalculating the density of said shadow region included in said original data based on said resultant dot percentage correction value and said basic data for correcting the shadow region.

8. The method of controlling exposure according to claim 7, wherein said predetermined calculation is defined by the following equation:

$$D'_{MAX} = D_{MAX} \pm K_S \cdot \delta_S$$

where $D'_{MAX}$ denotes the density of the shadow region of said original after the correction included in said original data, $D_{MAX}$ denotes the density of the shadow region of said original after the correction included in said original data, $K_S$ denotes a predetermined correction coefficient for the shadow region peculiar to the screen and $\delta_S$ denotes said defined resultant dot percentage correction value for the shadow region.

9. An apparatus for controlling exposure of an original to a photosensitive material through a screen by calculating a main exposure amount, a bump exposure amount and a flash exposure amount based on basic data peculiar to the combination of the screen and the photosensitive material and original data depending on the original in a process camera, said basic data including said main exposure amount, said bump exposure amount and said flash exposure amount for reproducing a predetermined reference original on said screen with a desired dot percentage, the apparatus comprising:
(a) means for preparing said basic data and said original data;
(b) means for obtaining a dot image by exposing said original to the photosensitive material through said screen based on said prepared basic data and original data;
(c) means for defining a resultant dot percentage correction value by obtaining differences between dot percentages of the portions of said obtained dot image, respectively, and the respective desired values said portions corresponding to a highlight region and a shadow region of said original; and
(d) means for correcting at least one of said main exposure amount, said bump exposure amount and said flash exposure amount based on said resultant dot percentage correction value and said basic data.

10. The apparatus for controlling exposure according to claim 9, wherein said basic data includes:
basic data for main exposure,
basic data for flash exposure,
basic data for bump exposure,
basic data for correcting a shadow region, and
basic data for correcting a highlight region.

11. The apparatus for controlling exposure according to claim 10, wherein
said original data includes the density of the highlight region of said original and the density of the shadow region of said original, and
said means (a) includes means for measuring said density of the highlight region of said original and means for measuring said density of the shadow region of said original.

12. The apparatus for controlling exposure according to claim 11, wherein said means (c) includes:
means for measuring a dot percentage of the portion of the obtained dot image, which portion corresponding to the highlight region of said original,
means for defining said resultant dot percentage correction value corresponding to the highlight region by obtaining the difference between said measured dot percentage of said obtained dot image and the desired dot percentage of the portion corresponding to the highlight region of said original,
means for recalculating the density of said highlight region included in said original data based on said resultant dot percentage correction value and said basic data for correcting the highlight region.

13. The apparatus for controlling exposure according to claim 12, wherein said means for recalculating the density of the highlight region includes,
means for comparing the original range of said original and the screen range of said screen, and
means for recalculating the density of said highlight region according to a predetermined calculation varying depending on an output of said comparing means.

14. The apparatus for controlling exposure according to claim 13, wherein
said predetermined equation is defined by the following equation:

$$D'_{MIN} = D_{MIN} \pm K_H \cdot \delta_H$$

where $D'_{MIN}$ denotes the density of the highlight region of said original after the correction included in said original data, $D_{MIN}$ denotes the density of the highlight region of said original after the correction included in said original data, $K_H$ denotes a predetermined correction coefficient peculiar to the screen and $\delta_H$ denotes said defined resultant dot percentage correction value corresponding to the highlight region, and
said correction coefficient $K_H$ is determined according to an equation varying depending on said comparison result.

15. The apparatus for controlling exposure according to claim 11, wherein said means (c) includes:
means for measuring a dot percentage of said portion of said obtained dot image corresponding to the shadow region of said original,
means for defining said resultant dot percentage correction value corresponding to the shadow region by obtaining the difference between said measured dot percentage of said obtained dot image and the desired dot percentage of the portion corresponding to the shadow region of said original,
means for recalculating the density of said shadow region included in said original data based on said resultant dot percentage correction value and said basic data for correcting the shadow region.

16. The apparatus for controlling exposure according to claim 15, wherein
said predetermined equation determined by the following equation:

$$D'_{MAX} = D_{MAX} \pm K_S \cdot \delta_S$$

where $D'_{MAX}$ denotes the density of the shadow region of said original after the correction included in said original data, $D_{MAX}$ denotes the density of the shadow region of said original after the correction included in said original data, $K_S$ denotes a predetermined correction coefficient for the shadow region peculiar to the screen and $\delta_S$ denotes said defined resultant dot percentage correction value for the shadow region.

* * * * *